US010395419B1

(12) United States Patent
Godzaridis et al.

(10) Patent No.: US 10,395,419 B1
(45) Date of Patent: Aug. 27, 2019

(54) NON-DESTRUCTIVE MULTI-RESOLUTION SURFACE CLIPPING

(71) Applicant: Bentley Systems, Incorporated, Exton, PA (US)

(72) Inventors: Elenie Godzaridis, Quebec (CA); Mathieu St-Pierre, Ste-Brigitte de Laval (CA)

(73) Assignee: Bentley Systems, Incorporated, Exton, PA (US)

( * ) Notice: Subject to any disclaimer, the term of this patent is extended or adjusted under 35 U.S.C. 154(b) by 68 days.

(21) Appl. No.: 15/669,593

(22) Filed: Aug. 4, 2017

(51) Int. Cl.
*G06T 15/30* (2011.01)
*G06T 17/20* (2006.01)
*G06T 17/05* (2011.01)

(52) U.S. Cl.
CPC .............. *G06T 15/30* (2013.01); *G06T 17/05* (2013.01); *G06T 17/20* (2013.01); *G06T 2210/12* (2013.01)

(58) Field of Classification Search
CPC ........ G06T 17/05; G06T 17/20; G06T 17/205
See application file for complete search history.

(56) References Cited

U.S. PATENT DOCUMENTS

| 6,208,997 B1 | 3/2001 | Sigeti et al. | |
| 2005/0159882 A1* | 7/2005 | Howard | G06Q 10/06 701/532 |
| 2007/0078636 A1* | 4/2007 | Elsberg | G06F 17/5004 703/2 |
| 2014/0152664 A1 | 6/2014 | Le Meur | |

OTHER PUBLICATIONS

Bruneton, Eric, and Fabrice Neyret. "Real-time rendering and editing of vector-based terrains." Computer Graphics Forum. vol. 27. No. 2. Oxford, UK: Blackwell Publishing Ltd, 2008. (Year: 2008).*

Zhou, Mengyun, Jing Chen, and Jianya Gong. "A virtual globe-based vector data model: quaternary quadrangle vector tile model." International Journal of Digital Earth 9.3 (2016): 230-251. (Year: 2016).*

Hugentobler, Marco, and Bernhard Schneider. "Breaklines in Coons surfaces over triangles for the use in terrain modelling." Computers & geosciences 31.1 (2005): 45-54. (Year: 2005).*

(Continued)

*Primary Examiner* — Daniel F Hajnik
(74) *Attorney, Agent, or Firm* — Cesari and McKenna, LLP; James A. Blanchette

(57) ABSTRACT

In an example embodiment, a technique is provided for surface mesh clipping. A surface mesh file and clip objects are received, and a unique identifier of a clip object is added to each node of a spatial index of the surface mesh that intersects the respective clip object. For any currently visible nodes, clip geometries and a series of meshes that partition the node into clipped regions are computed and stored in a clip file separate from the surface mesh file. Any non-currently visible nodes are computed and the clip file updated in response to display of the respective node. A clipped surface mesh is rendered by assembling regions of the surface mesh that are not affected by clip objects and clipped regions from the clip file, and the rendered clipped surface mesh is displayed.

22 Claims, 13 Drawing Sheets

(56) References Cited

OTHER PUBLICATIONS

Agrawal, Anupam, et al., "Geometry-Based Mapping and Rendering of Vector Data over LOD Phototextured 3D Terrain Models," Short Communications Proceedings ISBN 80-86943-05-4, WSCG'2006, Plzen, Czech Republic, UNION Agency-Science Press, Jan. 30-Feb. 3, 2006, pp. 1-8.

"Autodesk® InfraWorks Training Guide: Finding and Importing Data for Your Model," Autodesk, Inc., Jun. 18, 2013, pp. 1-71.

"Cesium 3DTiles™; *Specification for streaming massive heterogeneous 3D geospatial datasets*", <https://github.com/AnalyticalGraphicsInc/3d-tiles#will-3d-tiles-include-terrain>, Retrieved on Sep. 29, 2016, pp. 1-36.

Feldman, Bryan E., et al., "Animating Gases with Hybrid Meshes," Computer Graphics Proceedings, Annual Conference Series 2005, ACM SIGGRAPH2005, Los Angeles, CA, Aug. 1-4, 2005, pp. 904-909.

Ling, Yang, et al., "An Efficient Rendering Method for Large Vector Data on Large Terrain Models," Science China Information Sciences, vol. 53, No. 6, Jun. 2010, pp. 1122-1129.

Schneider, Martin, et al., "Efficient and Accurate Rendering of Vector Data on Virtual Landscapes," Journal of WSCG, UNION Agency-Science Press, Plzen, Czech Republic, Jan. 2007, vol. 15 No. 1-3, pp. 59-66.

U.S. Appl. No. 15/232,446, filed Aug. 9, 2016 by Elenie Godzaridis, et al. for Multi-Resolution Tiled 2.5D Delaunay Triangulation Stitching, pp. 1-40.

U.S. Appl. No. 15/293,105, filed Oct. 13, 2016 by Elenie Godzaridis, et al. for Hybrid Mesh From 2.5D and 3D Point Data, pp. 1-26.

Vaaraniemi, Mikael, et al., "Usability Oriented Visualization Techniques for 3D Navigation Map Display," Institut fur Informatik, Technische Universitat Munchen, Mar. 19, 2014, pp. 1-160.

Wake, Dan, et al., "A Hybrid Mesh Generation Method for Two and Three Dimensional Simulation of Semiconductor Processes and Devices," ResearchGate, CiteSeer, May 2000, pp. 1-8.

\* cited by examiner

NON-DESTRUCTIVE MULTI-RESOLUTION SURFACE CLIPPING

BACKGROUND

Technical Field

The present disclosure relates generally to computer graphics, and more specifically to techniques for non-destructive clipping of a surface mesh, such as a multi-resolution surface mesh.

Background Information

Various survey and computer aided design (CAD) tasks utilize large quantities of point data that describe the physical environment. The point data may be obtained from a variety of different sources, such as manual surveys, LiDAR, terrain models, etc. Some sources may only represent the physical environment in two and a half dimensions (2.5D), for example, as a height map or digital terrain model, and thereby provide only 2.5D data. Other sources may represent the physical environment in three-dimensions, for example, point clouds, and thereby provide 3D data. In order to more effectively utilize the point data, a mesh surface may be reconstructed from the individual points described in the data. Depending on the data source, the surface mesh may be a 2.5D or 3D surface mesh. The surface mesh may represent the physical environment at a number of different resolutions or levels of detail (LODs), and thereby be characterized as a multi-resolution surface mesh. Multi-resolution surface meshes may be indexed by a spatial index.

While it is often useful simply to render a surface mesh (e.g., a multi-resolution surface mesh) and display it in the user interface (UI) of a visualization and analysis application, further utility may be gained by combining the surface mesh with computer generated elements (e.g., computer aided design (CAD) objects) to create a combined display. Among other uses, the CAD objects may represent planned infrastructure (e.g., roads, bridges, pipelines, buildings, or other man-made structures), and the combined display may allow a user to visualize and make design adjustments to an infrastructure project. In order to combine CAD objects with a surface mesh, it is typically necessary to clip the surface mesh where the CAD objects are to be added, so that the surface mesh does not visually interfere with the objects (commonly referred to as the "z-fighting" problem). The clipping preferable is performed at or near real time, to allow the user to place and manipulate different CAD objects, to explore different design options.

While there are a number of existing clipping algorithms that may be adapted for this task, they suffer various shortcomings. Many existing algorithms utilize substantial resources and struggle to handle complex clipping tasks and extremely large multi-resolution surface meshes. They are often incapable of at, or near, real time operation (especially on electronic devices with limited processing and memory capabilities, such as low power mobile devices). Some algorithms do not fully prevent visually interference (z-fighting) at different resolutions, or introduce visual artifacts (e.g., gaps between CAD objects and the surface mesh, such that the objects appear to float above the surface mesh rather than be a part of it). Still further, some algorithms modify the surface mesh where it is originally maintained (i.e. are "destructive" to the original surface mesh), such that clipping for display purposes may prevent accurate analysis on the original surface mesh (e.g., volume computation, drainage analysis, etc.), may not allow real time modification of the clipping when CAD objects are modified, and different clipping for different projects may require inefficient data duplication.

Given these and other shortcomings, there is a need for improved techniques for clipping a surface mesh.

SUMMARY

Techniques are provided for clipping a surface mesh, such as a multi-resolution surface mesh. In one embodiment, clip geometries and a series of meshes for clip objects are cached in separate clip files that are persisted between sessions. The information in the clip files is linked to an original surface mesh file by adding a unique identifier of each clip object to each node of a spatial index of the surface mesh that intersects the respective clip object. When clip objects are added or changed, clipping is performed with a clipping priority strategy, with currently visible nodes for a current camera position clipped first, and the clip file updated to store relevant clip meshes. In addition "skirts" may be generated and relevant skirt meshes stored in the clip file. Other nodes are clipped (and skirts generated) in response to their display, such that clipping (and skirt generation) progresses as different portions of the surface mesh are viewed. Clip-specific metadata as well as geometric information may be utilized to skip the computation of certain clips that have little visual significance (e.g., clips at very low resolutions) to reduce resource demands.

In one specific embodiment, a surface mesh clipping software process of a visualization and analysis application implements an improved algorithm for rendering a clipped surface mesh. The surface mesh clipping software process receives a surface mesh file having a spatial index and one or more clip objects. The spatial index may be structured as a tree having a plurality of nodes. Each clip object may function as a mask where the surface mesh is to be hidden or a boundary within which the surface mesh is to be shown. The surface mesh clipping software process adds a unique identifier of a clip object to each node of the spatial index that intersects the respective clip object. For any currently visible nodes in a user interface on a display screen that intersects a clip object, the surface mesh clipping software process computes, and stores in a clip file separate from the surface mesh file, clip geometries and a series of meshes that partition the node into clipped regions. For any non-currently visible nodes, the surface mesh clipping software process computes and updates the clip file in response to display of the respective node. Thereafter, a clipped surface mesh is rendered by assembling regions of the surface mesh that are not affected by clip objects, and clipped regions from the clip file, and the rendered clipped surface mesh is displayed.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which.

DETAILED DESCRIPTION

Figure 1:
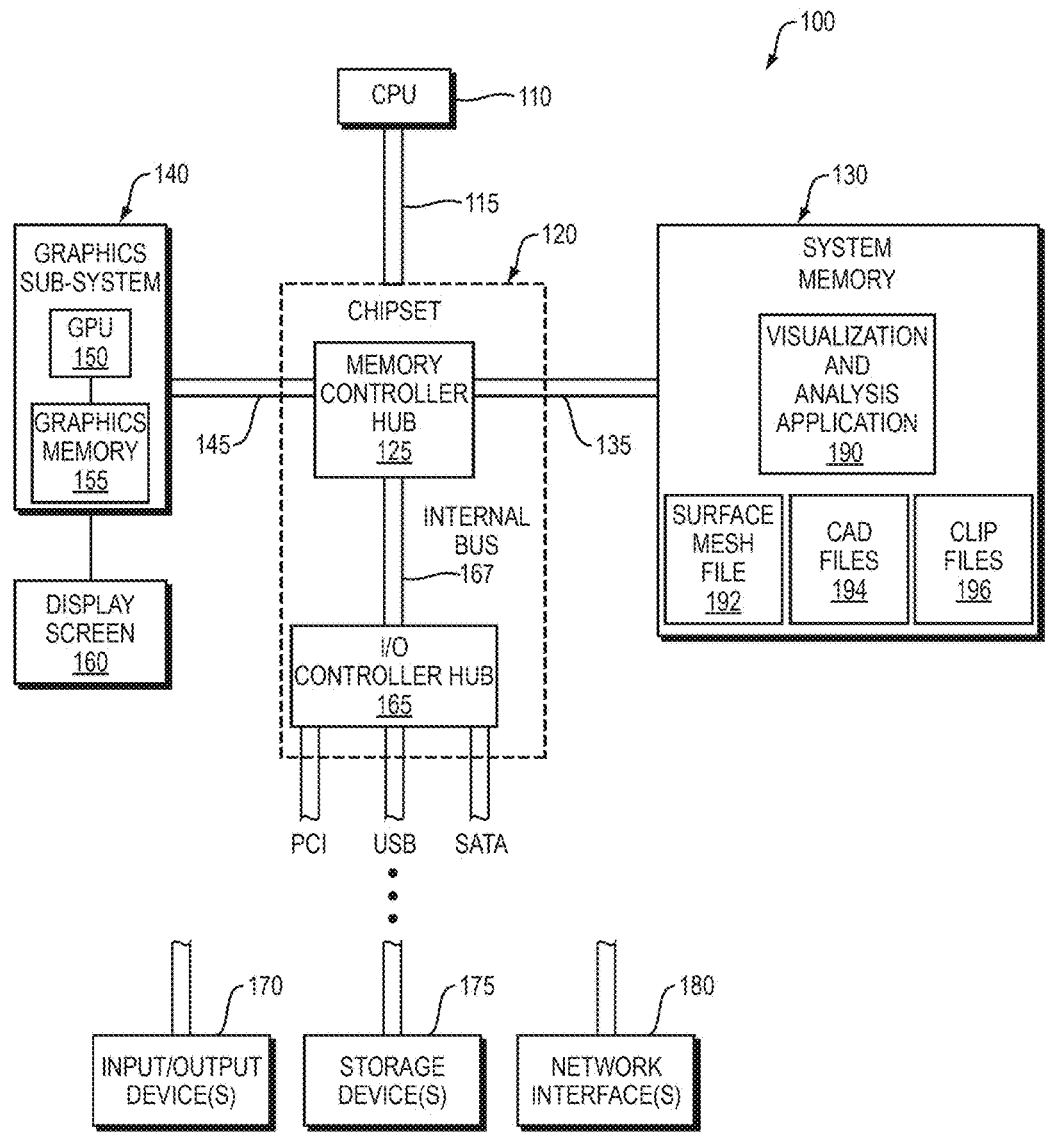
FIG. 1 is a block diagram of an example electronic device (e.g., a computer) that may be used with the present techniques.

FIG. 1 is a block diagram of an example electronic device 100 (e.g., a computer) that may be used with the present techniques. The electronic device includes a central processing unit (CPU) 110 that may be coupled to a chipset 120 by a front side bus 115. The chipset 120 includes a memory controller hub 125 that is responsible for communications with high-speed devices such as system memory 130 and a graphics subsystem (e.g., a graphics card) 140. The memory controller hub 125 is coupled to the system memory 130 by a high-speed memory bus 135. The system memory 130 is typically volatile memory, such as a Random Access Memory (RAM), which is adapted to store a wide range of software and data being actively used by the CPU 110. The memory controller hub 125 is coupled to a graphics subsystem 140 (e.g., a graphics card) by a high-speed graphics bus 145. The graphics subsystem 140 includes a CPU 150 and graphics memory 155, among other components. The graphics subsystem 140 is coupled to at least one display screen 160.

The chipset 120 further includes an input/output controller hub 165 coupled to the memory controller hub by an internal bus 167. Among other functions, the input/output controller hub 165 may support a variety of types of peripheral buses, such as a peripheral component interconnect (PCI) bus, a universal serial bus (USB) bus, and/or a Serial Advanced Technology Attachment (SATA) bus, for connecting to other system components. The system components may include one or more I/O devices 170, such as a keyboard, a mouse, a removable media drive, etc., one or more persistent storage devices 175, such as a hard disk drive, a solid-state drive, or another type of persistent data store, one or more network interfaces 180, such as an Ethernet interface or a Wi-Fi adaptor, among other system components. The network interface(s) 180 may allow communication with other electronic devices over a computer network, such as the Internet, to enable various types of collaborative, distributed, or remote computing.

Working together, the components of the electronic device 100 (and other electronic devices in the case of collaborative, distributed, or remote computing) may execute a number of different types of software that utilize various sources of data (e.g., files) persistently stored in storage devices 175 and loaded into memory 130 when needed. For example, software of a visualization and analysis application 190 may include a number of software processes, including a surface mesh clipping software process that operates to produce a clipped surface mesh on the display screen 160, which utilizes data including a surface mesh file 192, one or more computer aided design (CAD) files 194 and one or more clip files 196. In specific implementations, the application 190 may be a mapping-related application (such as the Bentley Map® 2D/3D desktop geographic information system (GIS) and mapping application), a civil infrastructure-related application (such as the Bentley OpenRoads™ transportation, civil analysis and design application), a mining-related application (such as the Bentley MineCycle™ Survey mine survey application), or another type of application that needs to render a clipped surface mesh as part of its operation.

Figure 2A:
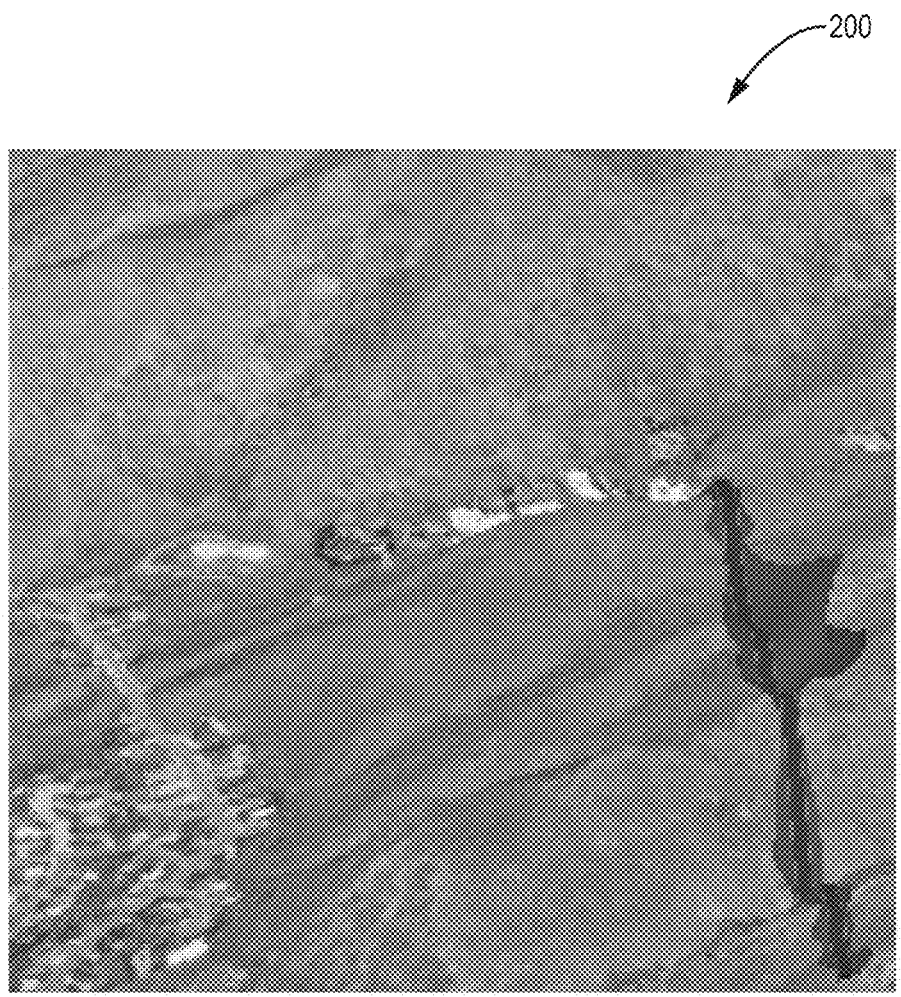
FIGS. 2A and 2B are low and high-resolution renders, respectively, of an example clipped surface mesh with added computer generated elements.
Figure 2B:
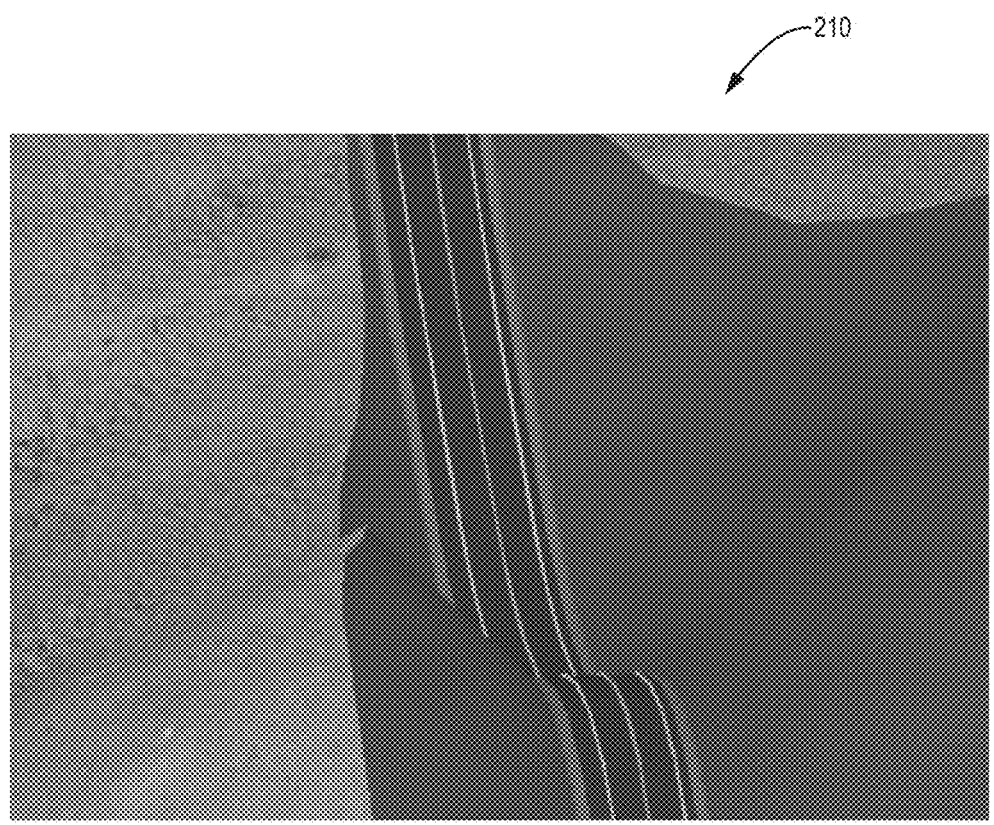

FIGS. 2A and 2B are low and high-resolution renders 200, 210, respectively, of an example clipped surface mesh with added computer generated elements. Such example clipped surface mesh with added computer generated elements may represent a possible result of the techniques described herein. In this example, the original multi-resolution surface mesh represents a 2.5D surface that is combined with CAD objects that represent a design of a road. The surface mesh is clipped at the location of the road so that CAD objects representing the road are not interfered with. The clipping may be defined by "clip objects" which, as used herein, refers to masking geometrical objects that indicate where the surface mesh is to be hidden or boundary geometrical objects that indicate where the surface mesh is to be shown. A clip object may be defined by a polygon or the intersection of a set of planes.

Figure 3A:
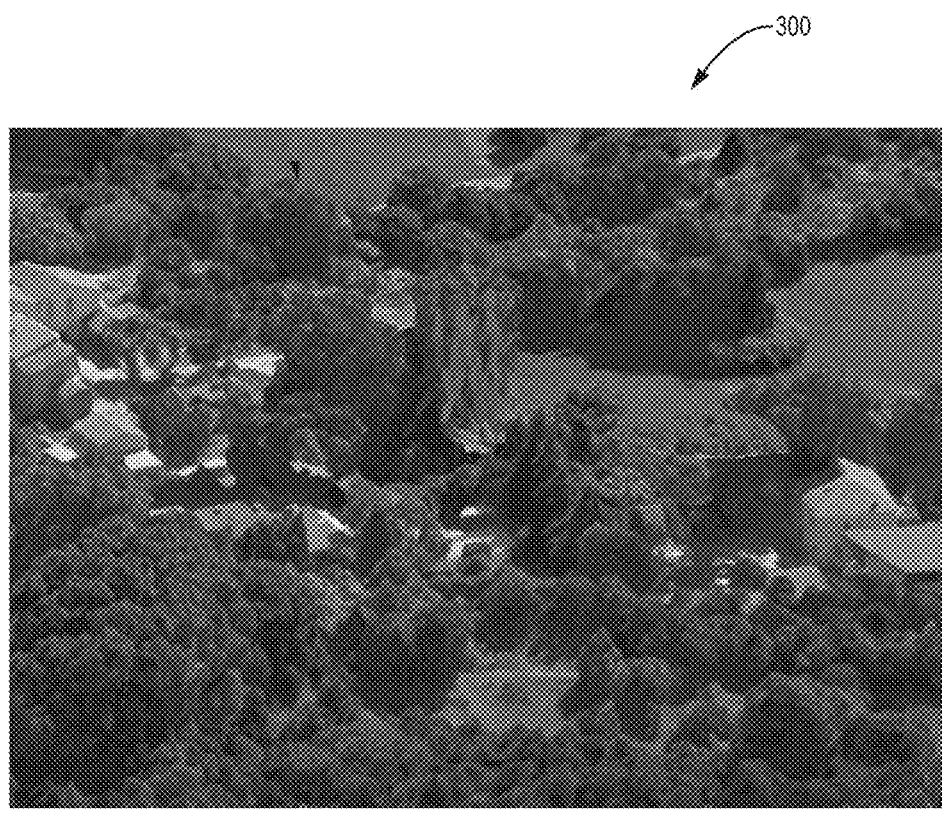
FIGS. 3A and 3B are a render of an example surface mesh, before and after clipping and addition of computer generated elements.
Figure 3B:
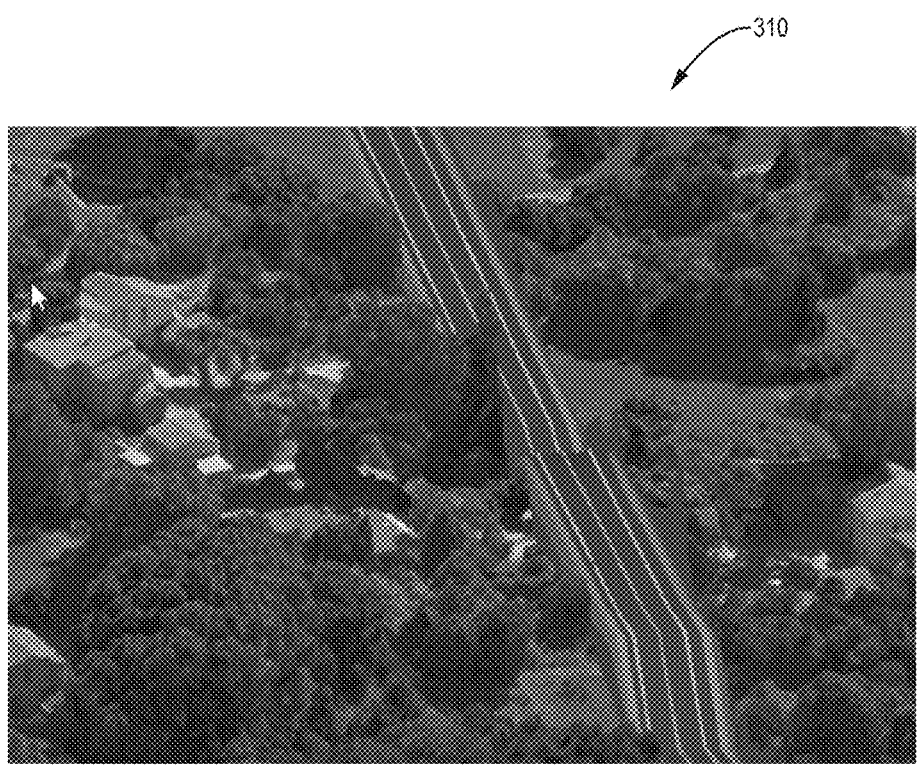

FIGS. 3A and 3B are renders 300, 310, respectively, of an example surface mesh, before and after clipping and addition of computer generated elements. In this example, the original multi-resolution surface mesh represents a 3D surface that is combined with CAD objects that represent a design of a road. The surface mesh is clipped based on clip objects so that CAD objects representing the road are not interfered with, to produce the display shown in FIG. 3B, which represents a possible result of the techniques described herein.

Figure 4:
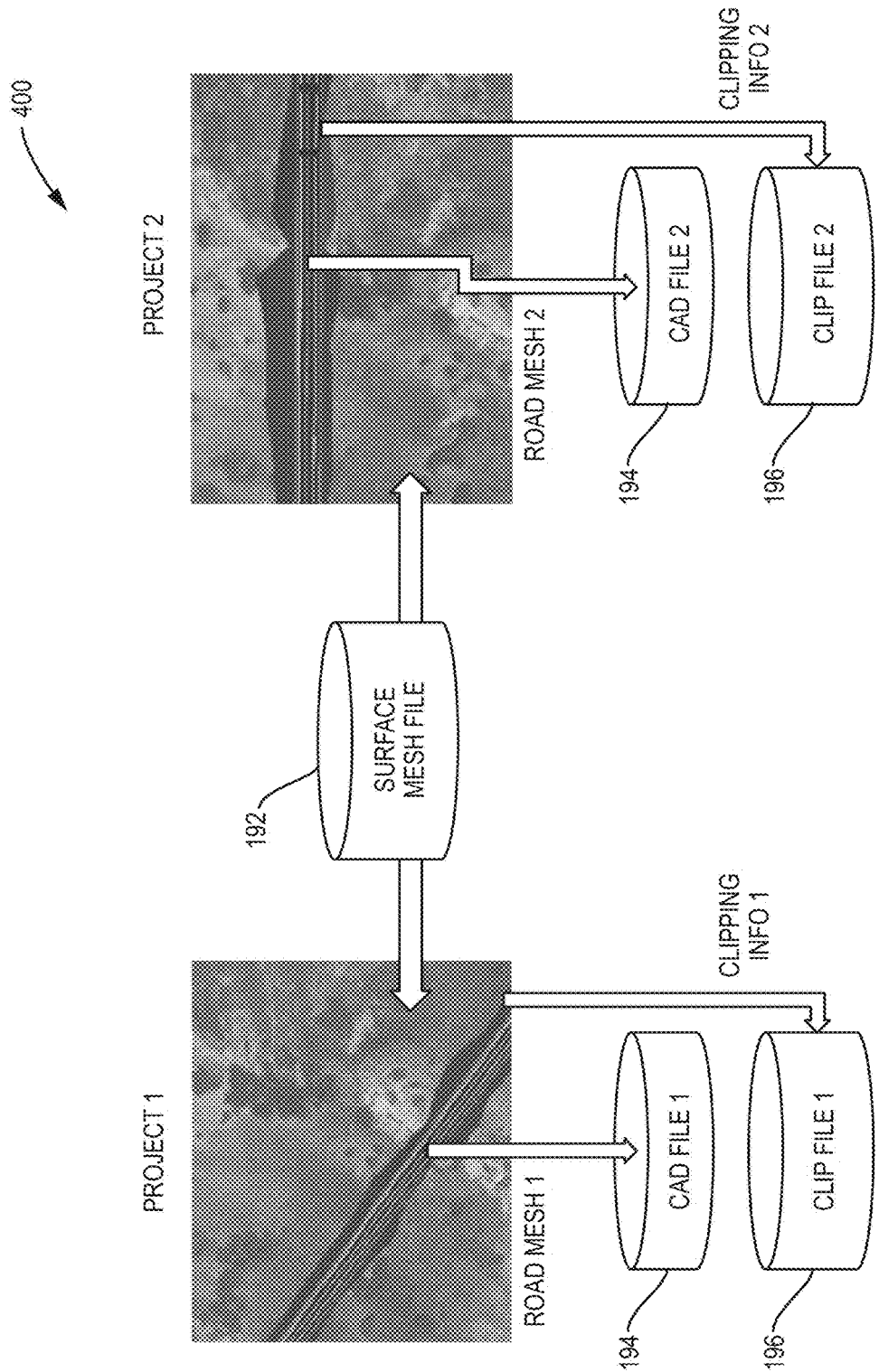
FIG. 4 is a block diagram illustrating example data sources utilized to produce a clipped surface mesh.

FIG. 4 is a block diagram 400 illustrating example data sources utilized to produce a clipped surface mesh. A surface mesh file 192 stores a large multi-resolution surface mesh having a spatial index. The spatial index may be arranged as a data structure (e.g., a tree structure such as a quadtree, octree, kd-tree, etc.) that represents multiple LODs. The multi-resolution surface mesh may be used by multiple CAD projects, such as Project 1 and Project 2 illustrated in FIG. 4. Each project may have its own associated CAD file 194 that stores CAD objects to combine with a portion of the multi-resolution surface mesh, in this example, representing a length of a road. Similarly, each project may have its own associated clip file 196 storing cached clip geometries and a series of meshes (clip meshes, skirt meshes, etc.) for clip objects sharing the same spatial index as the multi-resolution surface mesh. By applying the cached information from the clip file 196 to the multi-resolution surface mesh from the surface mesh file 192, a clipped surface mesh may be rapidly produced in a non-destructive manner (i.e. without changing the surface mesh file 192). The clipped surface mesh can then be combined with the CAD objects from a CAD file 194. This is illustrated in example visual displays 210, 220, that depict a result that may be shown in the user interface of the visualization and analysis application 190 on the display screen 160.

Figure 5:
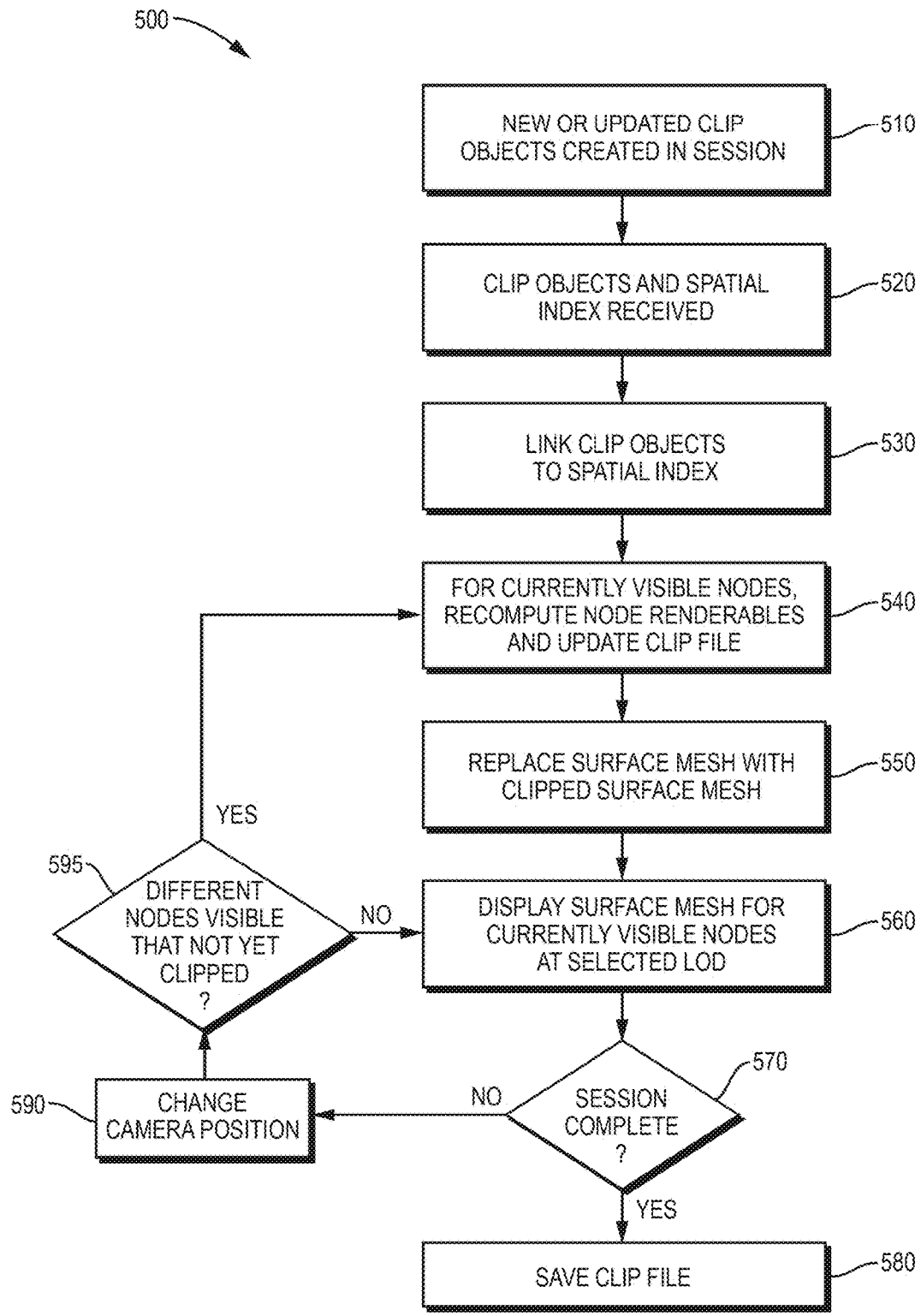
FIG. 5 is a high-level flow diagram showing an example sequence of steps for producing a clipped surface mesh that may be combined with CAD objects.

FIG. 5 is a high-level flow diagram showing an example sequence of steps 500 for producing a clipped surface mesh that may be combined with CAD objects. At step 510, clip objects are created in a session in the visualization and analysis application 190, for example, in response to user input that creates new, or updates existing, CAD objects. At step 520, clip objects and a spatial index of the multi-resolution surface mesh are received at a surface mesh clipping software process of the visualization and analysis application 190. At step 530, the surface mesh clipping software process links clip objects to the spatial index of the multi-resolution surface mesh in the surface mesh file 192. The linking may be performed by adding a unique identifier of each clip object to each node of the spatial index that intersects the respective clip object. At step 540, for currently displayed nodes for a current camera position in the visualization and analysis application 190, node renderables are computed and clip geometries and a series of meshes (e.g., clip meshes, skirt meshes, etc.) updated in the clip file 196. At step 550, the surface mesh for currently displayed nodes is replaced with the clipped surface mesh, where applicable. At step 560, the surface mesh for currently displayed nodes is displayed at a selected LOD. At step 570, a determination is made whether the session in the visualization and analysis application 190 is completed. If the session is complete, the clip file 196 is saved at step 580, to effectively cache clip geometries and a series of meshes (e.g., clip meshes, skirt meshes, etc.) between sessions. If the session is not yet complete, for any non-currently displayed nodes, the surface mesh clipping software process computes clip geometries and a series of meshes (e.g., clip meshes, skirt meshes, etc.) and updates the clip file in response to display of the respective node. To that end, the surface mesh clipping software process waits until a camera position in the visualization and analysis application 190 is changed at step 590. Then, at step 595, the surface mesh clipping software process checks whether the changed camera position causes different nodes to be displayed that have not been clipped. If so, execution loops back to step 540 where node renderables are recomputed for those nodes. If not, execution loops back to step 560 where the surface mesh is simply displayed.

Figure 6:
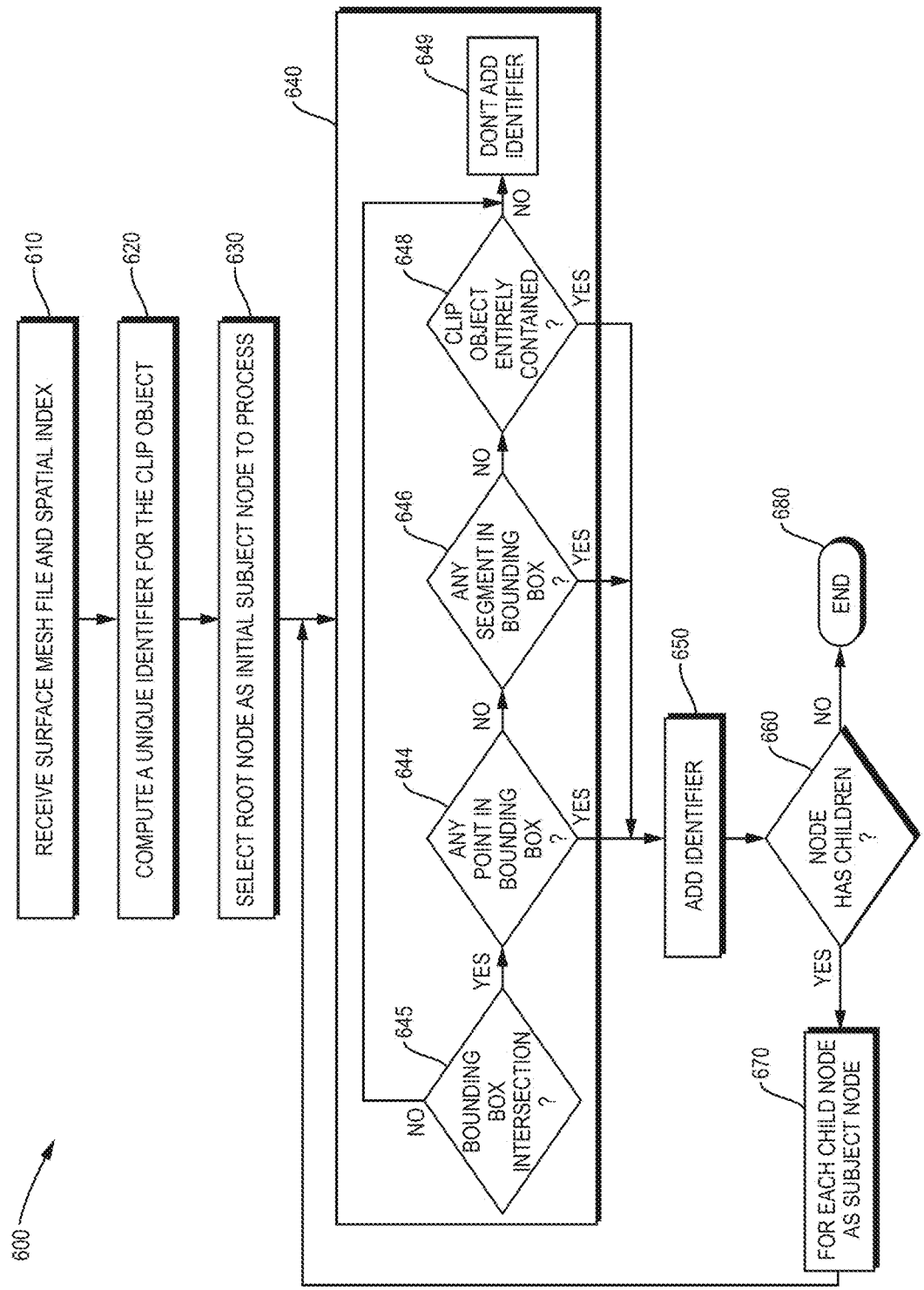
FIG. 6 is an expanded flow diagram, detailing an example sequence of steps for adding a unique identifier of a clip object to each node of a spatial index that intersects the clip object.

FIG. 6 is an expanded flow diagram of an example sequence of steps 600 for adding a unique identifier of a clip object to each node of a spatial index that intersects the clip object. At step 610, the surface mesh clipping software process receives the surface mesh file 192 and a clip object. At step 620, the surface mesh clipping software process computes a unique identifier for the clip object. At step 630, the surface mesh clipping software process selects a root node of the spatial index as an initial subject node to process. At step 640, the surface mesh clipping software process determines if the subject node intersects the clip object. Specifically, at step 645, a bounding box of the subject node is compared with a bounding box of the clip object, and it is determined if there is an intersection. If there is no intersection of the bounding boxes, execution proceeds to step 649, and no identifier is added to the subject node. If there is an intersection of the bounding boxes, execution proceeds to steps 644-648 were a more precise intersection of the actual clip object is considered to eliminate cases where a bounding box of the clip object (for instance, in the case of a large, non-convex polygon) spans a much larger area than the actual clip object. First, at step 644, the surface mesh clipping software process determines if any points of the clip object are contained within the bounding box of the subject node. If so, execution proceeds to step 650, and a unique identifier of the clip object is added to the subject node. If not, execution proceeds to step 646, where the surface mesh clipping software process determines if any segment of the clip object crosses the bounding box of the subject node. If so, execution proceeds to step 650, and the unique identifier of the clip object is added to the subject node. If not, execution proceeds to step 648, where the surface mesh clipping software process determines if the clip object is entirely contained within the bounding box of the subject node. If so, execution proceeds to step 650, and the unique identifier of the clip object is added to the subject node. If not, execution proceeds to step 649, and no identifier is added to the subject node. At step 660, the surface mesh clipping software process determines if the subject node has any child nodes. If so, execution proceeds to step 670 where each child node is selected, and thereafter steps 640-660 are repeated for each child node as the subject node. If not, execution proceeds to step 680 where the surface mesh clipping software process terminates.

In some cases, the steps 600 of FIG. 6 may be conducted on a simplified version of the clip object (e.g., a simplified polygon) to save time (e.g., because the number of segments may be the main computationally intensive factor). In such cases, the simplification may err on the side of generating more intersections than less, to avoid false negatives.

Figure 7:
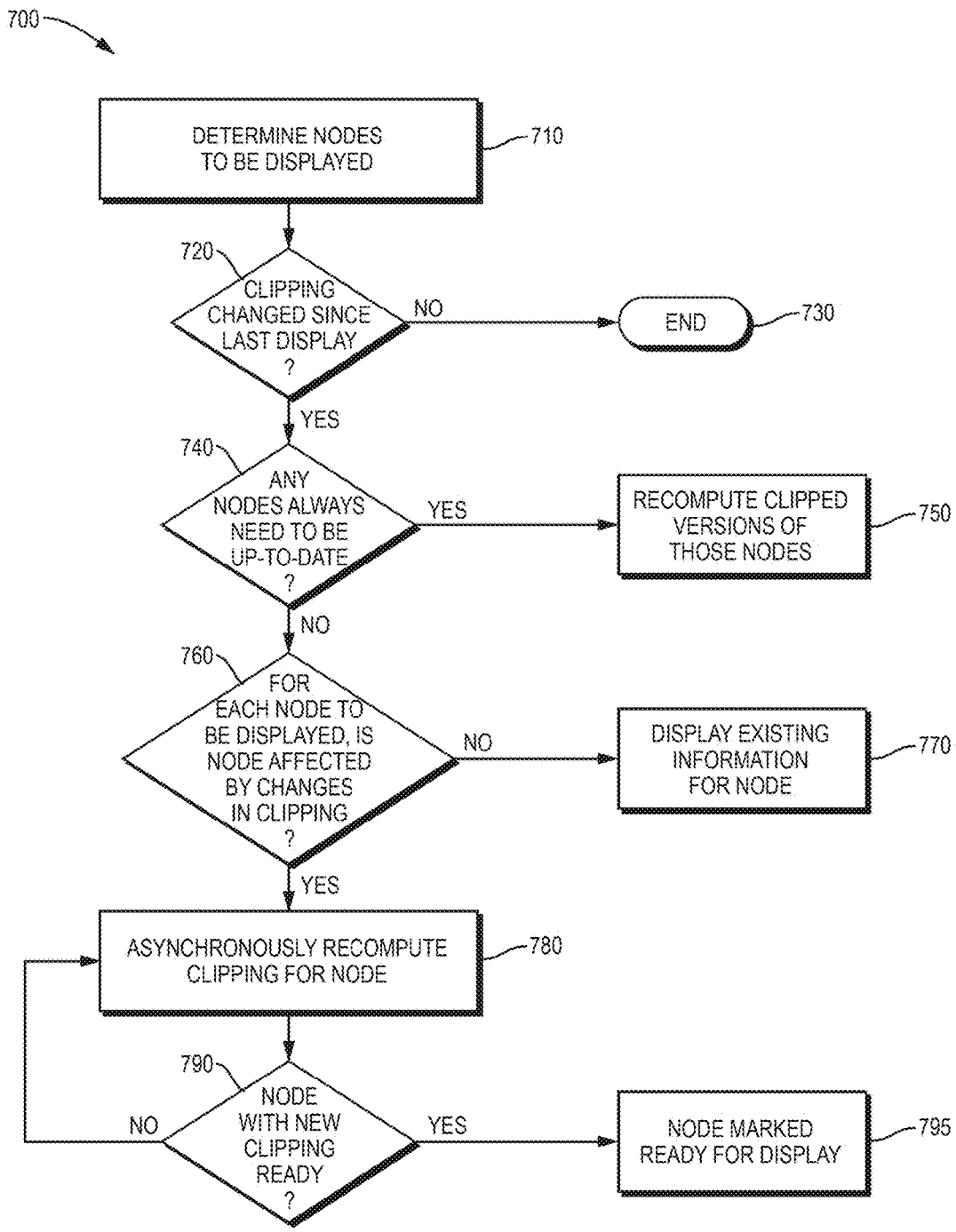
FIG. 7 is an expanded flow diagram showing an example sequence of steps for recomputing node renderables to reflect a new or updated clip object.

FIG. 7 is an expanded flow diagram of an example sequence of steps 700 for recomputing node renderables to reflect a new or updated clip object. At step 710, a surface mesh clipping software process determines nodes of the spatial index that need to be displayed, and at step 720, checks if any clipping has changed for those nodes. If no clipping has changed, execution ends at step 730. Otherwise, execution proceeds to step 740, where the surface mesh clipping software process determines whether these nodes are designated priority nodes that may always need to be up-to-date. If so, at step 750, the surface mesh clipping software process recomputes clipped versions of those priority nodes. If not, execution proceeds to step 760, where it is determined for each node that needs to be displayed, whether the node is affected by changes in clipping. If a node is unaffected, at step 770, the surface mesh clipping software process utilizes existing information for these nodes. If a node is affected, at step 780, the surface mesh clipping software process asynchronously recomputes clipping for the node. At step 790, the surface mesh clipping software process determines whether the recomputation for the node is complete. If not, recomputation is allowed to continue. If so, at step 795, the node is marked ready for display and the updated version rendered. Before the processing completes, the existing outdated version of the node is rendered.

Figure 8:
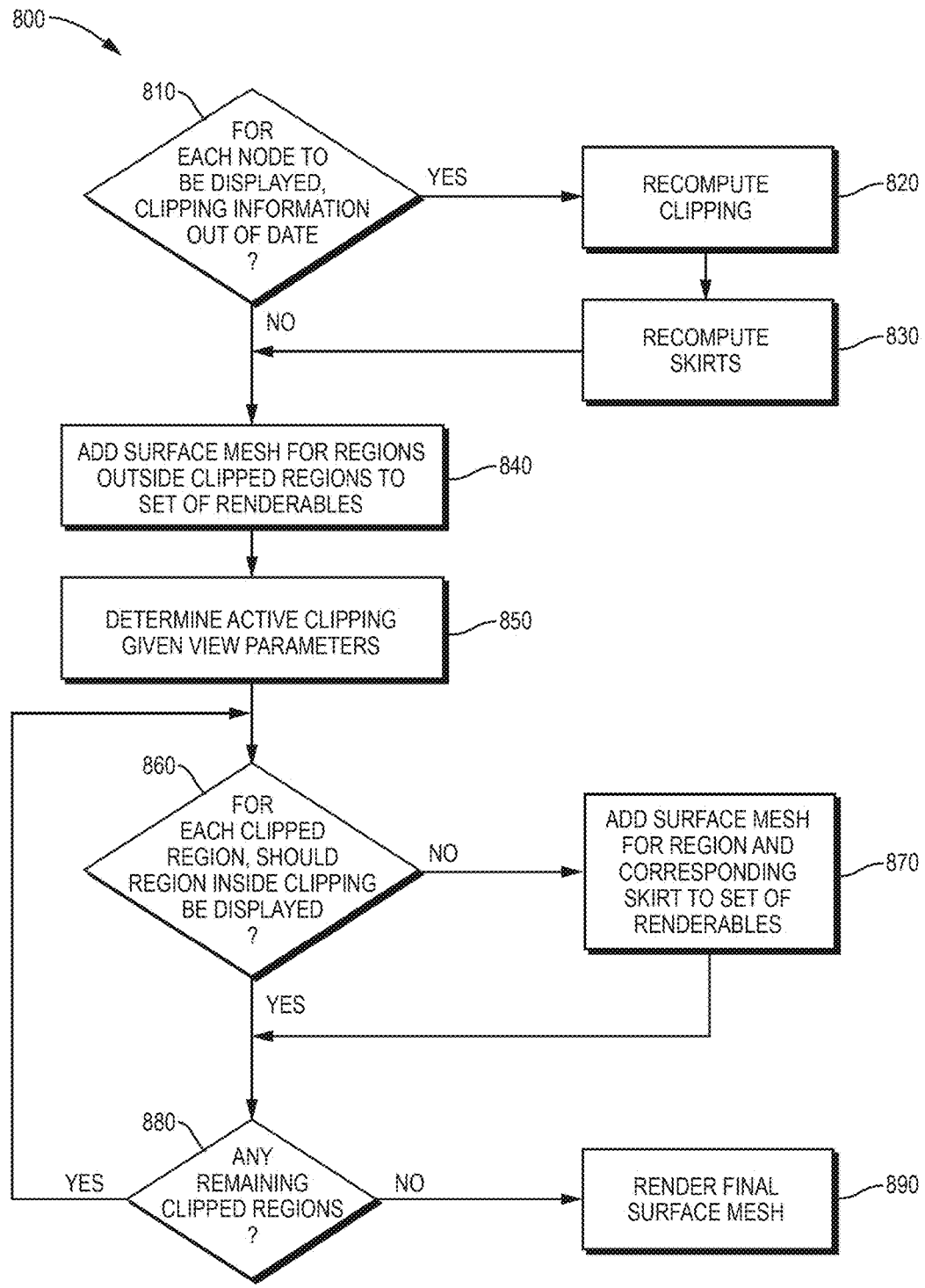
FIG. 8 is an expanded flow diagram showing an example sequence of steps for recomputing a node and creating renderables based on selectively displayed clip objects.

FIG. 8 is an expanded flow diagram of an example sequence of steps 800 for creating renderables based on selectively displayed clip objects. Steps 800 may occur as part of step 540 of FIG. 5. The steps 800 may be divided into two general phases. In a first phase, it is determined what clipping is applicable to each node. To that end, at step 810, for each node that should be displayed, the surface mesh clipping software process determines whether clipping information (e.g., clip meshes, skirt meshes, etc.) in the clip file 196 for the node is out-of-date. Clip meshes and skirt meshes are cached in the clip file 196 between sessions. As such, it is possible that for a given view of the node, it may be unnecessary to recompute clip meshes and skirt meshes, and they can simply be loaded and reassembled. This may be the case even if the visibility has changed between the current view and the time the information was stored. If information in the clip file 196 for the node is out-of-date, execution proceeds to step 820, where the surface mesh clipping software process recomputes clipping for the node and updates the clip file 196 to store new clip meshes. Then, at step 830, the surface mesh clipping software process recomputes skirts and updates the clip file 196 to store new skirt meshes. If information in the clip file 196 for the node is not out-of-date, or after recomputation of clipping and skirts in steps 820-830, at step 840 the surface mesh clipping software process adds the surface mesh for regions outside all clipped regions to a set of renderables for the node.

In a second phase, it is determined what clipping should be applied to each node given view parameters. At step 850, the surface mesh clipping software process determines clipping that is currently active (i.e., "on") given view parameters. For example, view parameters may indicate that some clipping is to be hidden in the current view. For clipping that is active, at steps 860-880 clip meshes and skirt meshes are successively added to the set of renderables for each clipped region that is to be shown. Finally, at step 890, a final surface mesh for the node is rendered based on the set of renderables.

Figure 9:
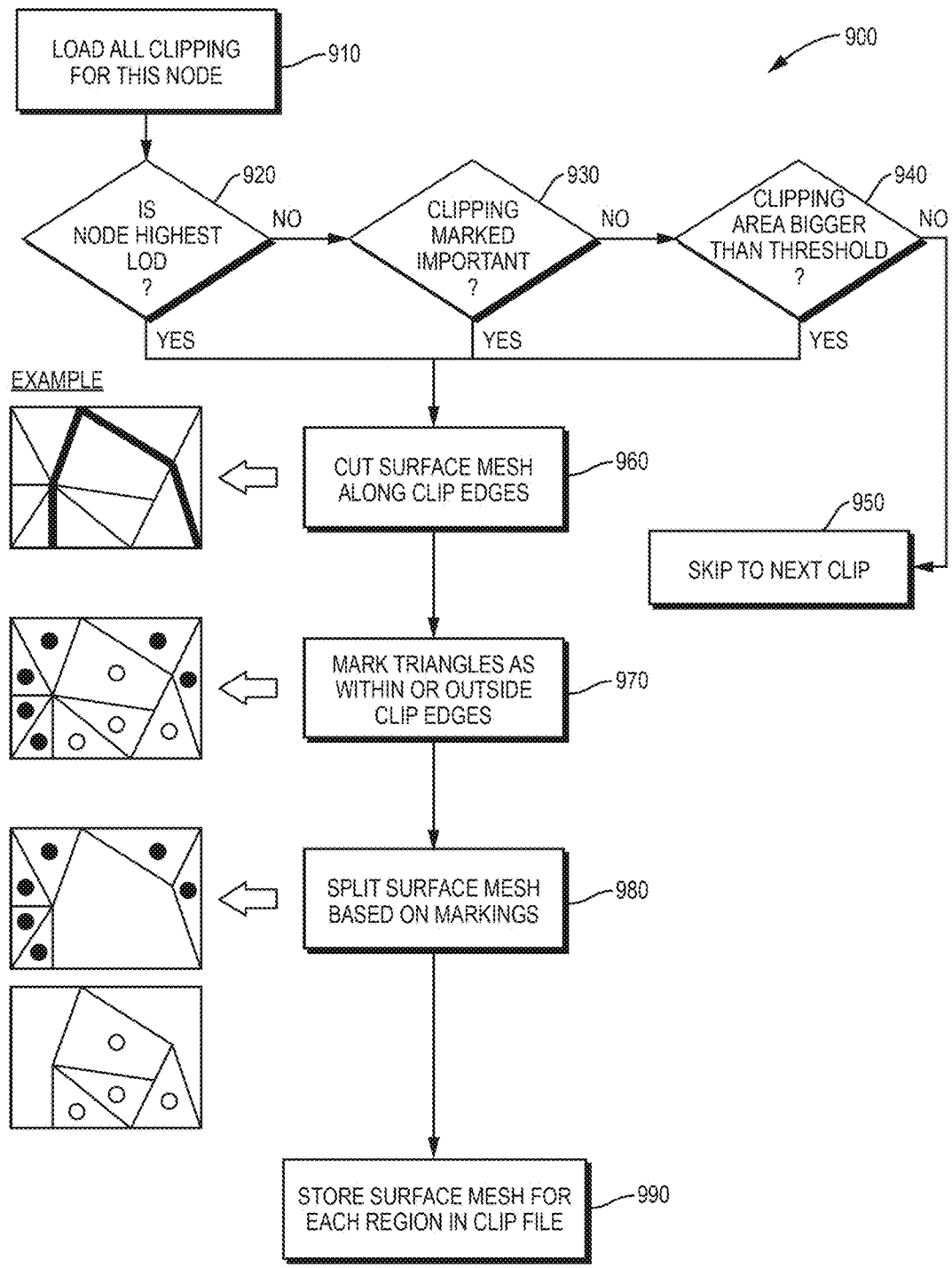
FIG. 9 is an expanded flow diagram showing an example sequence of steps to compute clipping on a node.

FIG. 9 is an expanded flow diagram of an example sequence of steps 900 to compute clipping for a node. The steps 900 may be performed as part of step 820 of FIG. 8. At step 910, the surface mesh clipping software process loads all clipping affecting the node. It is possible to use clip-specific metadata as well as geometric information to sometimes skip the computation of at least some clipping for a given node. To this end, it is determined at step 920 whether the node is at a highest LOD. In some implementations, all clipping may be applied for the highest LOD. For lower LODs, at step 930, a comparison is performed between an importance indictor and an importance threshold for the clipping. The importance indicator may be a user defined measure of importance for the clipping be shown. High importance clipping (e.g., an importance indictor greater than or equal to the importance threshold) may always be shown, with execution proceeding directly to steps 960-990 where the clip object is applied. Lesser importance clipping (e.g., having an importance indictor less than the importance threshold) may only be shown based on a comparison, at step 940, of a clip area (e.g., a percentage of an overall area of the node) to an area threshold. If the clip area is less than the threshold, execution proceeds to step 950, where the next clip is considered. For example, clipping that represents only a very small amount of the overall area of the node (e.g., less than a hundredth of a percent of the node's total area) may not be performed. Otherwise, execution proceeds to steps 960-990, where the clipping is performed. In some implementations, the area threshold may be set dynamically based on the importance indicator, such that less important clipping may have a higher area threshold than more important clipping.

At step 960, the mesh clipping software process cuts the surface mesh of the node along clip edges, to create a number of edges that define new portions (e.g., triangles) of the surface mesh. At step 970, the mesh clipping software process then marks these portions (e.g., triangles) of the surface mesh as belonging within or outside of the clip edges. At step 980, the mesh clipping software process splits the surface mesh based on the markings to create respective clipped regions. A variety of algorithms may be used to cut the surface mesh, mark the portions (e.g., triangles) of the surface mesh, and split the surface mesh based on the markings, depending on the data structure used for the surface mesh, the nature of the multi-resolution surface mesh (e.g., 2.5D or 3D) and other parameters. In some cases (e.g., 2.5D) assumptions can be made to streamline the operations. Finally, at step 990, a surface mesh for each region is stored in the clip file 196. The end result is that the surface mesh file 192 stores the original multi-resolution surface mesh, while the clip file 196 stores a series of clip meshes sharing the same spatial index, that represent clipped regions.

As mentioned above, in addition to the series of meshes that represent respective clipped regions, the clip file 196 may also store skirt meshes for skirts. As used herein, the term "skirt" refers to a small vertical mesh that is added at a clipping boundary to ensure connection between a CAD object and the surface mesh. The goal of skirts is to ensure that there is no gaps.

Figure 10:
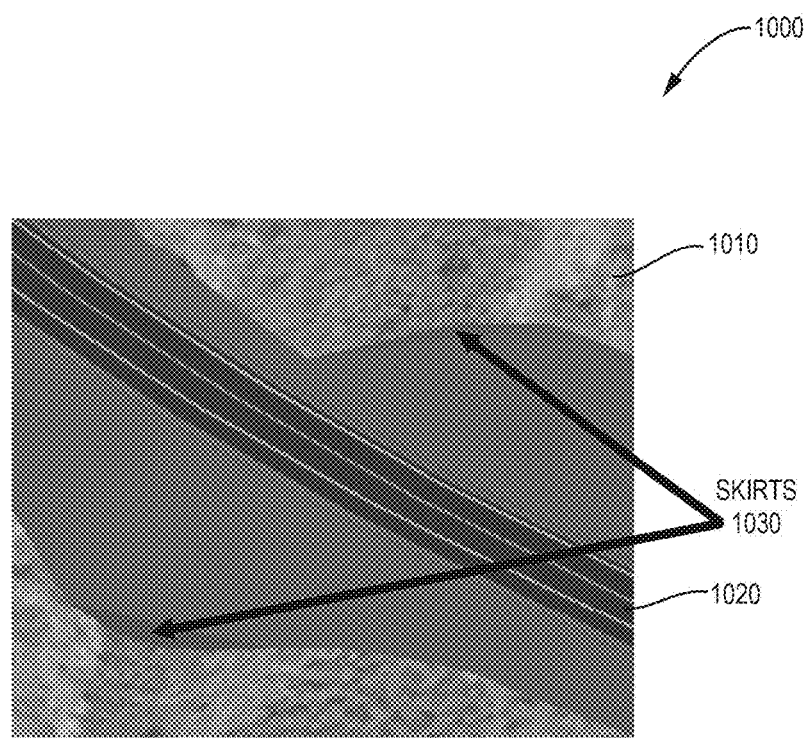
FIG. 10 is an enlargement of a portion of a render of an example clipped surface mesh with added CAD objects, which illustrates addition of skirts to ensure connection between CAD objects and the surface mesh.

FIG. 10 is an enlargement of a portion of a render 1000 of an example clipped surface mesh 1010 with added CAD objects 1020, which illustrates addition of skirts 1030 to ensure connection between the CAD objects and the surface mesh. As can be seen, without the skirts, there would be a gap between the CAD objects and the surface mesh.

Figure 11:
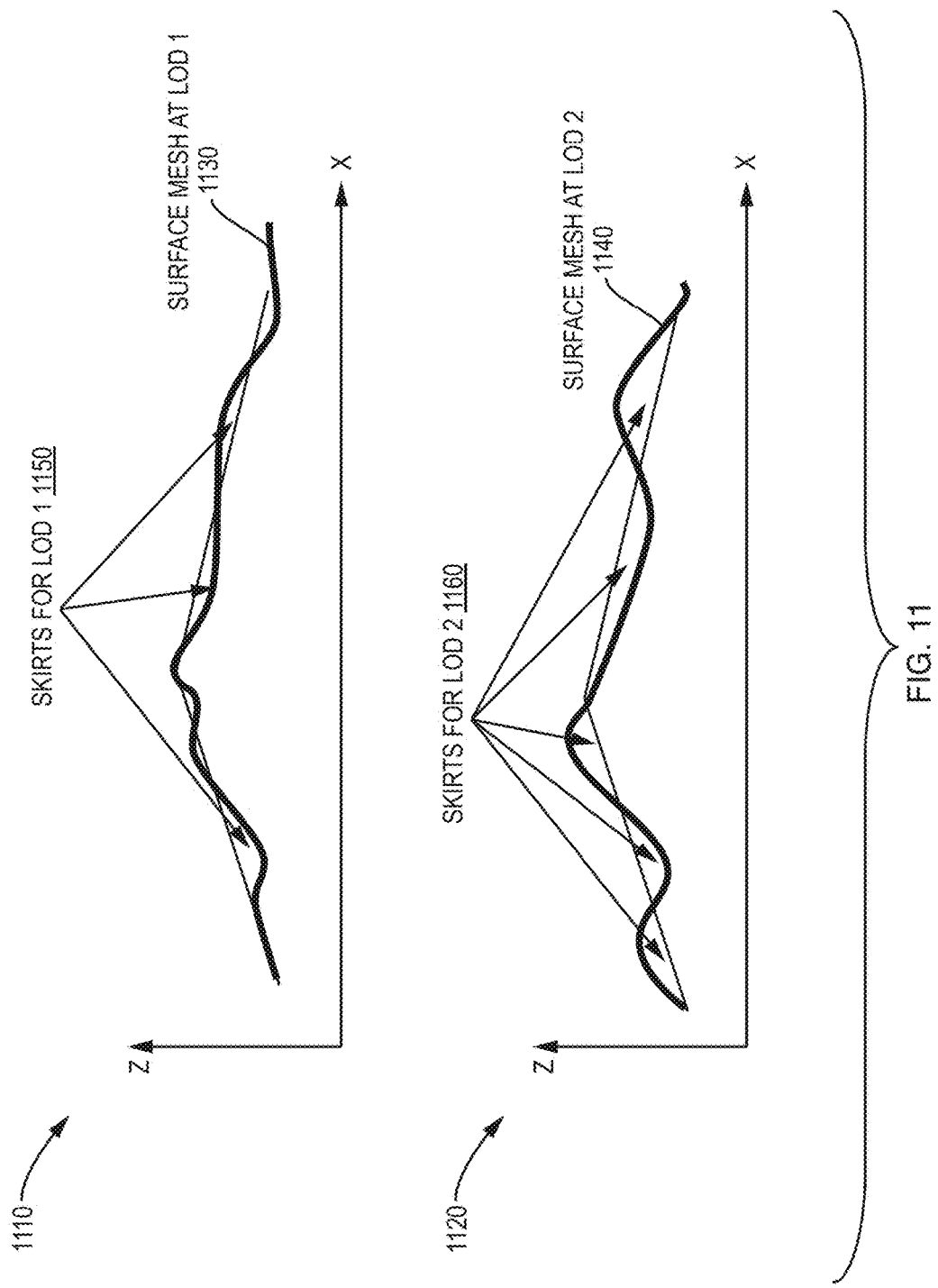
FIG. 11 is a pair of cross sections of an example surface mesh at two different LODs with skirts added.

Since the clipped surface mesh may have multiple LODs, different skirts may be computed and stored in the clip file 196 for each different LODs. FIG. 11 is a pair of profile sections 1110,1120 of an example surface mesh 1130, 1140 at two different LODs with skirts 1150, 1160. As can be seen, the skirts 1150, 1160 vary somewhat given the differing contours of the surface mesh at the different LODs.

In summary, the above description details example techniques for clipping of a surface mesh, such as a multi-resolution surface mesh. Such techniques may provide a number of advantages. Because information is cached in clip files between sessions, clipping is performed on a priority and display-responsive basis, with currently displayed nodes processed first and other nodes processed in response to their display. Geometric information may be utilized to skip the computation of certain clipping. The techniques may be capable of handling complex clipping tasks and extremely large multi-resolution surface meshes, while consuming decreased processing and memory resources. This may improve the functioning of electronic devices executing the techniques. Because visual interference (z-fighting) is addressed, and skirts are generated to fill gaps, the final result displayed to the user may also be improved in comparison to prior techniques. Likewise, since the techniques are non-destructive (i.e. the original surface mesh is maintained) accurate analysis on the original surface mesh (e.g., volume computation, drainage analysis, etc.) is still possible. Further, the information cached in clip files indicating clipped regions may be advantageously used for purpose other than selective display of the clipped regions, to decrease processing requirements and enable other efficiencies. For example, one can query within the spatial index only those nodes covered by a certain clip object, and within them only within a specific clipped region, while consuming little processing resources. This type of query may be used to readily limit is processing and analysis computations to only certain clipped regions, even when the definition of the region is very complex.

It should be understood that various adaptations and modifications may be readily made to what is described above, to suit various implementations and applications. While it is discussed above that many aspects of the techniques may be implemented in software (e.g., as executable instructions stored in a non-transitory electronic device readable medium for execution on one or more processors), it should be understood that some or all of the techniques may also be implemented in, or assisted by, hardware, for example, a GPU. A hardware implementation may include a variety of specially configured logic circuits and/or other types of hardware components. Above all, it should be understood that the above descriptions are meant to be taken only by way of example.

What is claimed is:

1. A method for rendering on a display screen a clipped surface mesh, comprising:
   receiving a surface mesh file and one or more clip objects, the surface mesh file storing a surface mesh organized by a spatial index structured as a tree having a plurality of nodes, each clip object functioning as a mask where the surface mesh is to be hidden or a boundary within which the surface mesh is to be shown;
   adding a unique identifier of a clip object to each node of the spatial index that intersects the clip object;
   for any currently displayed nodes in a user interface on a display screen that intersect one or more clip objects, computing, and storing in a clip file separate from the surface mesh file, clip geometries and a series of meshes that partition the node into clipped regions;
   for any non-currently displayed nodes, computing and updating the clip file in response to display of the respective node;
   rendering a clipped surface mesh by assembling regions of the surface mesh from the surface mesh file that are not affected by clip objects together with meshes of clipped regions from the clip file; and
   displaying the rendered clipped surface mesh on the display screen.

2. The method of claim 1, wherein the adding determines each node of the spatial index that intersects the respective clip object by:
   determining whether there is an intersection of a bounding box of the node and a bounding box of the clip object, and
   in response to a bounding box intersection, further determining whether any points of the clip object are contained within, any segment of the clip object crosses, or the clip object is entirely contained within the node.

3. The method of claim 2, wherein the determining and the further determining are performed first on a root node of the spatial index and are successively repeated on child nodes of the spatial index whose parents intersect the clip object.

4. The method of claim 1, wherein the updating the clip file is performed in response to a new or updated clip object that changes clipping for one or more nodes.

5. The method of claim 1, further comprising
   receiving a new or updated clip object;
   in response to the new or updated clip object, determining whether clipping has affected each displayed node;
   if the new or updated clip object has not affected a given node, utilizing existing clip geometries and meshes in the clip file for the given node; and
   if the new or updated clip object has affected the given node, recomputing clipping for the given node and updating clip geometries and meshes in the clip file.

6. The method of claim 5, wherein clipping for any designated priority nodes is recomputed first.

7. The method of claim 1, wherein the updating the clip file further comprises:
   determining a view of the surface mesh has changed;
   for each node to be displayed, determining clip geometries and meshes in the clip file for the node are out-of-date;
   if the clip geometries and meshes in the clip file for the node are not out-of-date, loading and using the existing clip geometries and meshes in the clip file;
   if the clip geometries and meshes in the clip file for the node are out-of-date, recomputing clipping on the node and updating the clip file.

8. The method of claim 7, wherein the rendering the clipped surface mesh further comprises:
   determining clipping that is currently active given view parameters; and
   for clipping that is currently active, successively adding clip meshes to a set of renderables for each clipped region that is to be shown.

9. The method of claim 1, wherein the computing further comprises:
   cutting the surface mesh along clip edges of a clip object;
   marking portions of the surface mesh that belong within or outside of the clip edges; and
   splitting the surface mesh based on the marking to create the clipped regions.

10. The method of claim 1, further comprising:
    combining the clipped surface mesh with computer aided design (CAD) objects.

11. The method of claim 10, wherein the computing further comprises:
    generating skirts that fill gaps between the CAD objects and the clipped surface mesh.

12. The method of claim 10, wherein the surface mesh represents terrain in the physical environment and the CAD objects represent planned infrastructure.

13. The method of claim 10, wherein the surface mesh is a multi-resolution surface mesh.

14. An electronic device comprising:
    a display screen;
    a processor; and
    a memory coupled to the processor and configured to store a plurality of files that include a surface mesh file that stores a surface mesh organized according to a spatial index having a plurality of nodes and a clip file that stores clip geometries and a series of meshes that partition the node into clipped regions, and instructions for a surface mesh clipping software process, the instructions executable on the processor and when executed operable to:
      receive the surface mesh file and one or more clip objects, each clip object functioning as a mask where the surface mesh is to be hidden or a boundary within which the surface mesh is to be shown;
      add a unique identifier of a clip object to each node of the spatial index that intersects the clip object;
      for any currently displayed nodes in a user interface on a display screen that intersect one or more clip objects, compute, and store in the clip file, clip geometries and a series of meshes that partition the node into clipped regions;

for any non-currently displayed nodes, compute and update the clip file in response to display of the respective node;

render a clipped surface mesh by assembling regions of the surface mesh from the surface mesh file that are not affected by clip objects together with meshes of clipped regions from the clip file; and display the rendered clipped surface mesh on the display screen.

15. The electronic device of claim 14, wherein the instructions are further operable to:

determine whether there is an intersection of a bounding box of the node and a bounding box of the clip object, and in response to a bounding box intersection, further determine whether any points of the clip object are contained within, any segment of the clip object crosses, or any the clip object is entirely contained within the node.

16. The electronic device of claim 14, wherein the instructions are further operable to:

update the clip file in response to a new or updated clip object that changes clipping for one or more nodes.

17. The electronic device of claim 14, wherein the instructions are further operable to:

receive a new or updated clip object;

in response to the new or updated clip object, determine whether clipping has affected each displayed node;

if the new or updated clip object has not affected a given node, utilize existing clip geometries and meshes in the clip file for the given node; and if the new or updated clip object has affected the given node, recompute clipping for the given node and update clip geometries and meshes in the clip file.

18. The electronic device of claim 14, wherein the instructions are further operable to:

determine a view of the surface mesh has changed;

for each node to be displayed, determine clip geometries and meshes in the clip file for the node are out-of-date;

if the clip geometries and meshes in the clip file for the node are not out-of-date, load and use the existing clip geometries and meshes in the clip file;

if the clip geometries and meshes in the clip file for the node are out-of-date, recompute clipping on the node and update the clip file.

19. The electronic device of claim 18, wherein the instructions are further operable to:

determine clipping that is currently active given view parameters; and for clipping that is currently active, successively add clip meshes to a set of renderables for each clipped region that is to be shown.

20. The electronic device of claim 14, wherein the instructions are further operable to:

cut the surface mesh along clip edges of a clip object;

mark portions of the surface mesh that belong within or outside of the clip edges; and split the surface mesh based on the marking to create the clipped regions.

21. The electronic device of claim 14, wherein the instructions are further operable to:

combine the clipped surface mesh with computer aided design (CAD) objects.

22. The electronic device of claim 21, wherein the instructions are further operable to:

generate skirts that fill gaps between the CAD objects and the clipped surface mesh.

* * * * *